United States Patent Office 3,364,280
Patented Jan. 16, 1968

3,364,280
ALKYLATION PROCESS WITH ACID CATALYST AND SULFONIUM OR PHOSPHONIUM SALT PROMOTER
George M. Kramer, Baytown, Tex., assignor to Esso Research and Engineering Company, a corporation of Delaware
No Drawing. Continuation-in-part of application Ser. No. 326,368, Nov. 27, 1963. This application Jan. 3, 1966, Ser. No. 517,931
10 Claims. (Cl. 260—683.51)

This is a continuation-in-part of my earlier filed case, U.S. Ser. No. 326,368, filed Nov. 27, 1963, which was issued as U.S. Patent 3,231,633 on Jan. 25, 1966.

This invention relates to the alkylation of hydrocarbons. More particularly, the invention pertains to the alkylation of aliphatic and aromatic hydrocarbons with olefinic compounds. More particularly still, this invention relates to an alkylation process carried out in the presence of an alkylation catalyst and a promoter which enhances the alkylation reaction. The promoter comprises either a surface active sulfonium salt or a surface active phosphonium salt. It is most preferred to use either the sulfonium salt or the phosphonium salt in critical amounts in order to maximize the effectiveness of the alkylation reaction.

The strong acid catalyzed addition of an alkane to an alkene to form a desired product is well known. In fact, this process is utilized to form the isooctane which is so important for gasoline blending as well as to provide compounds which are useful as solvents.

Alkylation in general whether it be the alkylation of an aliphatic or an aromatic compound has met with a variety of problems in the past. The basic problem has concerned the difficulties encountered in controlling the alkylation reaction in order to produce a maximum amount of high quality alkylate. In the past, the desired reaction product has not been produced in the quantities that were desired for maximum economy. In addition, there has been a great deal of acid consumption in all acid catalyzed alkylation reactions. The problem is particularly acute when working with sulfuric acid which is a relatively expensive reagent. In large scale operations in the oil industry wherein isobutane and isobutene are reacted to form the desired isooctane, consumption of sulfuric acid has resulted in a catalyst cost of several million dollars. In addition, there is a marked tendency toward catalyst fouling and this serves to lower the quality and quantity of the product obtained.

Turning to the most important single alkylation reaction, i.e., the formation of isooctane from the reaction of isobutane and butenes, the following mechanism of reaction is presented.

1.
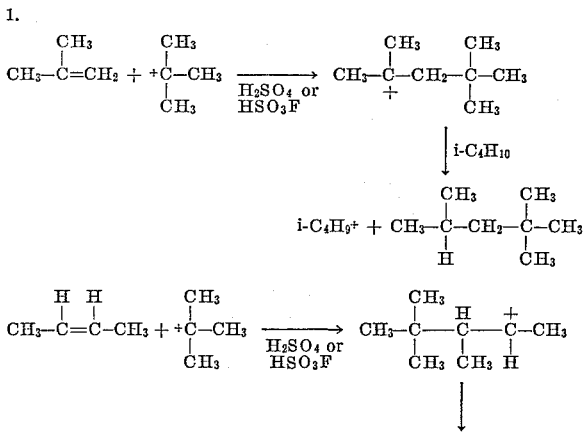

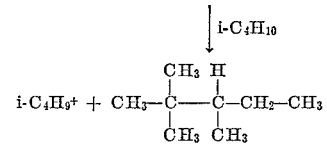

The most important rate determining factor in this reaction is believed to be the hydride extraction step. The hydride extraction step refers to the removal of an $H^-$ from the isobutane and the subsequent or simultaneous addition of the $H^-$ to $C_8^+$ to form trimethylpentane from the appropriate ion. The trimethylpentane represents a desirable high octane configuration. Forming the 1 to 1 olefin-paraffin adduct, e.g., octane, does not proceed as rapidly as would be desired. This is a contributing factor to the eventual low yields of isooctane. The adduct ions, e.g., $C_8^+$ ions, participate in undesirable side reactions at a faster rate than the desirable but slower hydride extraction reaction which leads to the formation of isooctane. The side reactions lead to the formation of $C_{12}$ products which then undergo cracking reactions to form undesirable lighter hydrocarbons such as, for example, $C_5$, $C_6$ and $C_7$ light aliphatic components. The result, of course, is the eventual minimization of the production of desired isooctane products and the lowering of the octane number of the alkylate obtained.

A variety of attempts have been made to solve the problem of acid consumption and minimum isooctane production. None of these have met with a great degree of success. Included in the methods which have been attempted previously are the lowering of the reaction temperature, increasing the mixing efficiency and increasing the isoparaffin to olefin ratio in the feed. None of these methods have met with any great degree of success.

Recently, U.S. Patent No. 2,880,255 was issued. This patent was concerned with producing an improved alkylation reaction. The desired result was obtained by adding a promoting agent to the alkylation catalyst. The most preferred promoting agent according to the patent is a mercaptan. A wide variety of mercaptans may be utilized such as aliphatic mercaptans, aryl mercaptans, alkyl aryl mercaptans, etc. The alkyl mercaptans utilized, according to Patentee, must contain about 10 to 20 carbon atoms per molecule and at least 8 carbon atoms per molecule. The concentrations of mercaptans to be utilized are 0.2 to 0.001 mole of mercaptan per mole of catalyst. However, Patentee requires the use of relatively large quantities of promoter.

According to this invention, it has unexpectedly been found that improved selectivity and reduced consumption of the strong acid catalyst, such as HF, fluorosulfonic acid and sulfuric acid, may be effected by contacting an alkylatable hydrocarbon and an olefin at reaction conditions in the presence of a modified catalyst. The catalyst is modified by adding to it a minor amount of a promoter. The promoter is chosen from the group consisting of ionizible organic sulfonium salts and ionizable organic phosphonium salts. Tertiary, secondary and primary phosphonium and sulfonium salts may be utilized in this invention. A phosphonium salt or a sulfonaum salt dissociates and yields its native cation in sulfuric acid.

Any alkyl phosphonium or sulfonium salt will promote a strong acid catalyzed alkylation reaction provided that it is surface active. The best surfactants usually contain at least one long alkyl chain, $C_8$–$C_{20}$ units in length. However, improvement in the alkylation reaction will be achieved with any alkyl group of $C_8$ or more in lengths which is present. Improved product distribution and lower acid consumption are both realized.

At least one of the carbons which are joined to the sulfur or the phosphorus atom must be part of an alkyl chain of 8 to 20 carbon atoms in length, preferably 10 to 18 in length and most preferably 12 to 16 in length. Thus, typical phosphonium and sulfonium salts which are ionizable and may be utilized in the instant invention are as follows:

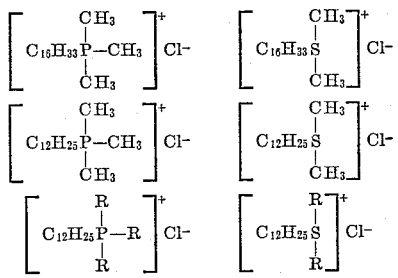

where R is alkyl, naphthyl, aromatic or hydrogen.

The long alkyl chain may contain branched substituents and may be bonded at any carbon along the chain but will preferably be an unbranched linear chain, bonded through its terminal carbon.

However, the mere use of the alkyl sulfonium salts or alkyl phosphonium salts which are ionizable will not always obtain the desired results. This is because if either of the ions, which are formed in solution, is present in too large a quantity, a stable emulsion may be formed. For example, 0.1 mole percent of $[C_{16}H_{33}P(CH_3)_3]^+$ or $[C_{16}H_{33}S(CH_3)_2]^+$ in $H_2SO_4$ causes a relatively stable emulsion to form when a volume of the acid solution is shaken with an equal volume or less of 3-methylpentane or debutanized alkylate. This emulsion takes more than one hour to separate by settling. Such an emulsion renders the use of this concentration of surfactant impractical for commercial alkylation in which settling times longer than about 20 minutes are prohibitive. Consequently, a critical amount of alkyl sulfonium salt ar alkyl phosphonium salt which is soluble in sulfuric acid is added to the alkylation reaction. The critical amount to be added of phosphonium salt or sulfonium salt containing a long chain alkyl group is between 0.0005 and 0.2 weight percent depending on the surface active properties of the specific compound. This would be about $2 \times 10^{-6}$ to $8 \times 10^{-4}$ moles of a $C_{16}$ alkyl phosphonium or $C_{16}$ alkyl sulfonium salt per mole of catalyst with a preferred concentration of about $4 \times 10^{-5}$ moles per mole of catalyst. This is considerably less than the $10^{-3}$ to $2 \times 10^{-1}$ range utilized in U.S. Patent 2,880,255. Using quantities as high as 0.001 mole of hexadecyl mercaptan per mole of catalyst would result in a stable emulsion forming which would take more than one hour to settle out.

The preferred promoters of the instant case are an acid soluble sulfonium salt having at least one long alkyl chain of 8 to 20 carbon atoms and an ionizable phosphonium salt having at least one alkyl group of 8 to 20 carbon atoms. Either of these preferred promoters are to be added in the amount of 0.0005 to 0.2 weight percent of catalyst to the alkylation reaction. In the case of a sulfuric acid catalyzed alkylation reaction, this represents about $2 \times 10^{-6}$ to $8 \times 10^{-4}$ moles of a $C_{16}$ additive per mole of catalyst. The most preferred range of promoters would be 0.001 to 0.1 weight percent.

The instant promoter, either the surface active sulfonium or surface active phosphonium salt, may be utilized in all alkylation reactions such as the well-known reactions of an olefin with an alkylatable compound which may be an aliphatic hydrocarbon, an aromatic hydrocarbon or perhaps an alicyclic compound. As mentioned previously, the most important use for this catalyst concerns the reaction of butylenes and isobutane to form isooctane. However, within the realm of the aliphatic alkylations, this invention is intended to cover all reactions between olefins and paraffins. This would include, of course, the reaction between an olefin having from $C_2$ to $C_{10}$ carbon atoms and a paraffin having from $C_4$ to $C_{10}$ carbon atoms. All reactions between these olefins and paraffins are intended to fall within the scope of this invention regardless of whether or not the olefins are iso or straight chain derivatives. It is apparent that several different paraffins and olefins may be reacted to form various octanes such as:

$$i\text{-}C_5H_{12} + C_3H_6 \rightarrow C_8H_{18}$$
$$i\text{-}C_4H_{10} + C_4H_8 \rightarrow C_8H_{18}$$

or other highly branched paraffins suitable for motor gasoline. For instance, isopentane and propylene may be reacted to form isooctanes while isobutane and propylene yield mainly isoheptanes.

Several different strong acids are known which may be utilized in the alkylation of an aliphatic or aromatic hydrocarbon with an olefin. The most widely used and preferred of these catalysts is sulfuric acid and this invention is, of course, intended to include all sulfuric acid alkylations. It is also applicable to other strong acid catalyzed alkylation reactions; these other strong acids include hydrofluoric and fluorosulfonic acid. Other strong acids suitable for this invention could be enumerated but no advantage is seen in merely reiterating those acids which are well-known in the art. The above described acids are all Brönsted acids or substances which readily give off protons.

In general, any of the conventional catalytic alkylation reactions can be carried out by the process of the instant invention. Thus, the alkylation reaction can comprise reaction of an isoparaffin with an olefin or reactions of an aromatic hydrocarbon with an olefin or other alkylating agent. These reactions will take place in the presence of a suitable alkylation catalyst. In place of an olefin as an alkylation agent, various alcohols and ethers such as isopropyl alcohol, tertiary-butyl alcohol, secondary-butyl alcohol, isopropyl ether and the like can be used as alkylating agents. Likewise, the corresponding alkyl esters such as the alkyl halides, sulfates, phosphates, fluorides of the olefins, may be used as the alkylation agent with an appropriate, compatible alkylation catalyst.

The alkylation reaction is carried out with the hydrocarbon reactants in the liquid phase; however, the reactants need not be normally liquid hydrocarbons. Cataylst is also utilized in the liquid phase and the phosphonium and sulfonium additives can be added either before or after the reaction has begun. The reaction temperature can vary from sub zero to as high as 200° F., preferably 30° to 120° F. Pressure may also vary widely; acceptable pressures are between atmospheric and as high as 1000 p.s.i. and higher, preferably 10 to 150 p.s.i.g. The operation will also proceed effectively in a partial vacuum. Space velocities ranging from 0.01 to about 20 volumes of olefin/volume acid-hour may be utilized. Reaction times of 10 to 60 minutes are commonly used although much shorter times may be possible in special equipment. As mentioned above, 0.0005 to 0.2 weight percent of long chain $C_8$–$C_{20}$ aliphatic sulfonium or long chain $C_8$–$C_{20}$ phosphonium salt must be added to the strong acid catalyzed reaction. If less than the critical amount of phosphonium or sulfonium salt is added, the phosphonium and sulfonium salts are not present in sufficient strength to produce the desired results. The minimum concentration of sulfonium or phosphonium salt to be added will vary somewhat with the length of the alkyl chain, the purity of the compound and the presence of any branching in the chain. An estimate of this concentration may be obtained for a specific compound by constructing a surface tension or interfacial tension (acid-paraffin) vs. log concentration plot for the compound in $H_2SO_4$ and graphically determining the concentration at which the phosphonium or sulfonium salts becomes surface active. If too much phosphonium or sulfonium salt is added, an emulsion is formed which in some cases will last indefinitely and in other cases will settle after a prolonged period of time. In the instances where the emulsion will settle out after a prolonged period of time, the alkylation reaction will be impractical to carry out on a commercial scale. This is because commercial reactors have fixed settling capacity and one cannot process feed more rapidly than the settler can separate the alkylate product from the acid emulsion.

*Example 1*

This example illustrates the improved results which are obtained when utilizing a small amount of a long chain aliphatic sulfonium salt as a promoter in conjunction with a sulfuric acid catalyst. In particular, in this example a straight run which makes use of $H_2SO_4$ is compared with a mixed acid catalyst, the catalyst comprising 98% sulfuric acid and 0.01 weight percent of $$[C_{16}H_{33}P(CH_3)_3]^+$$

Constant temperatures are used for both runs, i.e., 50° F., and the pressure is also kept at a constant level of 80 p.s.i.g.

TABLE I

|  | Catalyst | |
| --- | --- | --- |
|  | $H_2SO_4$ | $H_2SO_4$+.01 wt. percent $C_{16}H_{33}P(CH_3)_3^+HSO_4^-$ |
| Feed, wt. percent: | | |
| i-C_4H_10 | 93.90 | 93.90 |
| C_4H_8, Refinery Mixture | 6.10 | 6.10 |
| O.S.V., v./hr./v | 0.06 | 0.06 |
| Production Distribution, wt. percent: | | |
| C_5–C_7 | *5.5 | 2.5 |
| C_8 | *94.5 | 97.5 |
| 224 TMP in C_8 | 40 | 42 |

* Analysis of best product.

From the above, it is apparent that the use of a small amount of a long chain phosphonium salt produces a highly significant improvement in the alkylation reaction. The combination of $H_2SO_4$ and the phosphonium salt resulted in an octane improvement of 0.4 to 0.5 units and produced 3% more $C_8$ and 2% more 224 trimethylpentane in the $C_8$ fraction. The acid consumption is also considerably lower for the combined catalyst. This is evidenced by the fact that after equivalent amounts of feed are passed through a reactor containing first fresh 98% of $H_2SO_4$ and then 98% $H_2SO_4$ modified with 0.01% of $$[C_{16}H_{33}P(CH_3)_3]^+$$

the respective spent acid strengths are 93.2 and 04.9–95%.

*Example 2*

In this example, the same conditions as in Example 1 are utilized except that in the place of the alkyl phosphonium salt, a sulfonium salt, $[C_{16}H_{33}S(CH_3)_2]^+ HSO_4^-$, is utilized in the same quantities. The results are substantially identical thus indicating that the combined $H_2SO_4$ and sulfonium catalyst is superior to the use of $H_2SO_4$ alone.

*Example 3*

The purpose of this example is to indicate the criticality of the range of alkyl phosphonium salt or alkyl sulfonium salt which may be added to $H_2SO_4$ in order to provide a better alkylation catalyst without causing undue settling problems due to the formation of emulsion.

In order to determine the critical range of phosphonium salt or sulfonium salt necessary to provide maxium efficiency in the instant invention, a series of mixing experiments are carried out. Two milliliters of sulfuric acid taken from a commercial alkylation reaction are mixed with 1 milliliter of 3-methylpentane. The 3-methylpentane is a typical alkylation product and is, of course, maintained in the liquid phase. The two are vigorously shaken in a glass vial for 5 minutes in a conventional shaker at room temperature and atmosphereic pressure. Measurements are made of the time for the acid and 3-methylpentane phases to separate from one another. Experiments are then carried out with 0.01, 0.1 and 1.0 weight percent of the alkyl sulfonium ion which was $$[C_{16}H_{33}S(CH_3)_2]^+$$

added to the acid. Simultaneously the same experiment was conducted with the alkyl phosphonium ion which was $[C_{16}H_{33}P(CH_3)_3]^+$. The following results are observed in both cases; at 0.01% of $[C_{16}H_{33}S(CH_3)_2]^+$ or $[C_{16}H_{33}P(CH_3)_3]^+$ added to the acid there was no measurable effect on the settling rate. When 0.1 wt. percent of $[C_{16}H_{33}P(CH_3)_3]^+$, or $[C_{16}H_{33}S(CH_3)_2]^+$ is present, the hydrocarbon phase separated in three to six minutes. At 1% by weight of the phosphonium and sulfonium salts a stable emulsion is formed. This emulsion did not break in one hour. Thus, from the above it is apparent that working with as little as 1 weight percent of $$[C_{16}H_{33}P(CH_3)_3]^+ \text{ or } [C_{16}H_{33}S(CH_3)_2]^+$$

would provide for a stable emulsion and disrupt a commercial reactor. Consequently, applications range of 0.0005 to 0.2 weight percent is critical and must be followed in order to successfully utilize the process of the instant invention.

*Example 4*

In this example, 350 cc. of fresh concentrated sulfuric acid containing 1.0 weight percent of $$[C_{16}H_{33}P(CH_3)_3]^+HSO_4^-$$

is mixed with 350 cc. of debutanized alkylate which is $C_5^+$ alkylate at a reaction temperature of 75° to 80° F. and atmospheric pressure. The mixture is stirred for one minute in a standard glass mixing flask. An emulsion is formed which does not settle clearly in 24 hours.

*Example 5*

The above example is duplicated exactly except that a sulfonium salt, i.e., $[C_{16}H_{33}S(CH_3)_2]^+HSO_4^-$ is utilized instead of the phosphonium salt which is $$[C_{16}H_{33}P(CH_3)_3]^+HSO_4^-$$

Substantially identical results are achieved.

Although the above examples are restricted to alkylation of paraffins, it is readily apparent to one skilled in the art that this invention would equally be applicable to the alkylation of aromatics.

It is also readily apparent that so long as at least one $C_8$–$C_{20}$ alkyl group is present in the sulfonium or phosphonium salt there may be branched chain carbons affixed to any point on the chain.

Any ionizable phosphonium or sulfonium salts may be utilized. This includes the sulphate, chloride, etc.

Although this invention has been described with some degree of particularity, it is intended only to be limited by the attached claims.

What is claimed is:

1. An alkylation process which comprises contacting an alkylatable paraffinic hydrocarbon and an olefinic alkylating agent at alkylation conditions with a catalyst composition comprising a strong acid selected from the the group consisting of sulfuric acid, hydrofluoric acid and fluorosulfonic acid and 0.0005 to 0.2 wt. percent, based on the weight of said catalyst, of a promoter selected from the group consisting of sulfonium salts having at least one aliphatic group of $C_8$–$C_{20}$ and phosphonium salts having at least one aliphatic group of $C_8$–$C_{20}$.

2. The process of claim 1 wherein said acid is hydrofluoric acid.

3. The process of claim 1 wherein said acid is sulfuric acid.

4. The process of claim 3 wherein both of said $C_8$–$C_{20}$ aliphatic groups are alkyl groups.

5. An alkylation process which comprises contacting butylene with isobutane in the presence of a catalyst under alkylation conditions, the said catalyst comprising a strong acid selected from the group consisting of sulfuric acid, hydrofluoric acid, fluorosulfonic acid and 0.0005 to 0.2 wt. percent, based on the weight of said catalyst, of a promoter selected from the group consisting of aliphatic sulfonium salts having a $C_8$–$C_{20}$ alkyl group.

6. The process of claim 5 wherein said acid is sulfuric acid.

7. A process for carrying out an alkylation reaction which comprises contacting a hydrocarbon mixture containing an alkylatable hydrocarbon and an alkylating agent at alkylation conditions with a catalyst composition comprising a strong acid selected from the group consisting of HF, $H_2SO_4$ and fluorosulfonic acid and 0.0005 to 0.2 wt. percent, based on the weight of said catalyst, of a promoter selected from the group consisting of surface-active sulfonium salts and surface-active phosphonium salts having at least one aliphatic group of $C_8$ through $C_{20}$ in length.

8. The process of claim 7 wherein said strong acid is sulfuric acid.

9. An alkylation process which comprises contacting a $C_2$–$C_{10}$ paraffinic hydrocarbon and a $C_2$–$C_{10}$ olefinic hydrocarbon in the liquid phase at a temperature of 30°–120° F. and a pressure of 10–150 p.s.i.g. with a catalyst composition comprising a strong acid selected from the group consisting of sulfuric acid, hydrofluoric acid, fluorosulfonic acid and 0.0005 to 0.2 wt. percent, based on the weight of said catalyst, of a promoter selected from the group consisting of sulfonium salts and phosphonium salts having at least one normal $C_8$–$C_{20}$ alkyl group.

10. The process of claim 9 wherein said paraffinic hydrocarbon is a $C_4$ paraffin and said olefinic hydrocarbon is isobutylene.

References Cited

UNITED STATES PATENTS

| | | | |
|---|---|---|---|
| 3,231,633 | 1/1966 | Kramer | 260—683.51 |
| 2,077,831 | 4/1937 | Felix | 252—355 X |
| 2,819,228 | 1/1958 | Dell | 252—311.5 X |
| 2,880,255 | 3/1959 | Davis et al. | 260—683.63 |

PAUL M. COUGHLAN, JR., *Primary Examiner.*

DELBERT E. GANTZ, *Examiner.*

R. H. SHUBERT, G. J. CRASANAKIS,
*Assistant Examiners.*